Dec. 25, 1962   W. W. HASTINGS   3,069,910
BOURDON TUBE PRESSURE GAUGE
Filed Aug. 24, 1959

INVENTOR.
Warren W. Hastings
BY
ATTORNEY

United States Patent Office 3,069,910
Patented Dec. 25, 1962

3,069,910
BOURDON TUBE PRESSURE GAUGE
Warren W. Hastings, Rochester, N.Y., assignor, by mesne assignments, to American Radiator & Standard Sanitary Corporation, New York, N.Y., a corporation of Delaware
Filed Aug. 24, 1959, Ser. No. 835,552
2 Claims. (Cl. 73—411)

This invention relates to pressure gauges, and more particularly to Bourdon tube operated pressure gauges. More specifically, the present invention relates to a helical type Bourdon gauge.

Conventional Bourdon tube gauges are complicated in construction and require an intricate mechanical connecting linkage for translating the movement of the Bourdon tube to the indicating portion of the gauge. This renders them extremely vulnerable to shock and vibration. This mechanical linkage also tends to cause a definite lagging effect of the indicator when it changes direction. Moreover in conventional helical Bourdon tube gauges a different tube is required for each different range scale.

One of the objects of this invention is to provide an improved Bourdon tube operated gauge having improved means for translating the movement of the tube to the indicating pointer of the gauge.

Another object of this invention is to provide an improved Bourdon tube operated gauge wherein the same Bourdon coil can be used in a wide variety of gauges for various pressure ranges.

A further object of this invention is to provide an improved Bourdon tube operated pressure gauge which permits the use of a more rigid tube thereby contributing to the stability of the pointer for any given indication.

A further object of this invention is to provide an improved Bourdon tube operated pressure gauge wherein a very small angular motion or deflection is required of the tube for a given scale range.

A further object of this invention is to provide an improved Bourdon tube operated gauge wherein the tube is subjected to minimum stresses and low hysteresis thereby providing a gauge having maximum life.

A still further object of this invention is to provide an improved Bourdon tube operated pressure gauge which is of simple construction, which may be made with parts that are light and have a low moment of inertia, and which will withstand extreme shock and vibration.

Other objects of this invention will become apparent from the specification, the drawing, and the appended claims.

Figure 1:
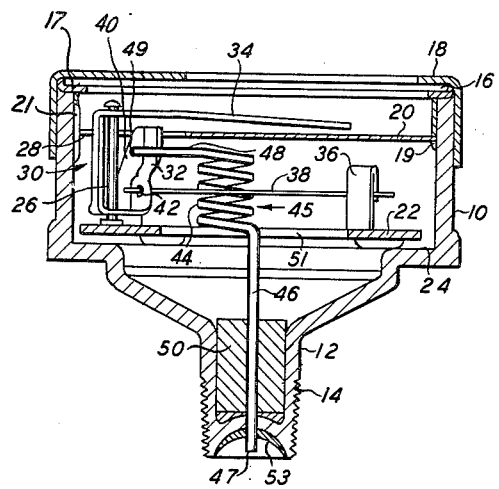
FIG. 1 is an axial section through a pressure gauge built according to one embodiment of this invention.

Referring in detail to the drawing, the gauge comprises a cylindrical casing 10 having an axially extending hollow stem 12, which stem is externally threaded at 14 for attaching the gauge to a source of pressure. The casing 10 is covered by a glass 16 which is mounted in a ring 17 and is secured in place by a bezel 18. Spaced from the glass 16 and supported in the casing 10 by inwardly extending tangs 19 is a graduated dial 20.

This dial is held against rotation relative to the casing by angularly spaced tongues 21 which engage in notches cut in the periphery of the dial. Mounted beneath the dial 20 and spaced therefrom is a plate 22 which is riveted or otherwise secured to lugs 23 of the casing above an annular flange 24 which is integral with the casing.

A pivot pin 26 is mounted on the plate 22 normal to the plane of this part, with its upper end extending through an opening 28 in the dial 20. A U-shaped crank unit 30 is pivotally mounted on the pin 26. A pointer 34 is integral with one arm of the unit 30 and extends laterally therefrom in a direction generally radial of the axis of the pivot pin 26 in the space between the glass 16 and the dial 20 to read against the various graduations of the dial.

Figure 2:
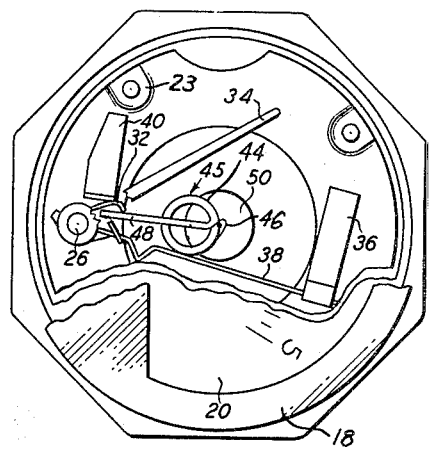
FIG. 2 is a plan view of this gauge with a portion of the cover glass and dial cut away to show the interior mechanism.
Figure 3:
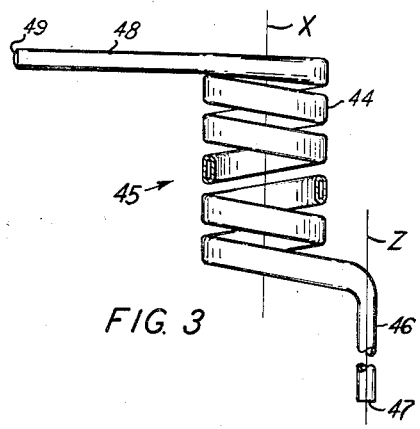
FIG. 3 is a side elevation, partly in section of the helical Bourdon tube used in this gauge.
Figure 4:
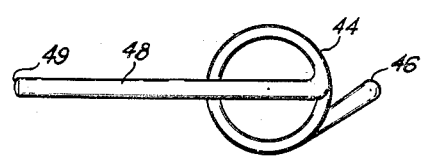
FIG. 4 is a plan view of this tube.

A lug 36 is struck up from the plate 22 to support and anchor the end of a spring 38. This lug 36 has a portion bent over on itself and over one end of the spring 38 to firmly secure the spring in place. A stop member 40 (FIG. 2) is also struck up from the plate 22 and limits the counterclockwise rotation, as viewed in FIG. 2, of the unit 30. The free end of the spring 38 extends into an opening 42 of one arm 32 of the pointer unit and constantly urges the crank unit 30 and the pointer 34 in a clockwise direction, as viewed in FIG. 2.

45 denotes a Bourdon tube. This tube is wound in the form of a helical coil 44 and has a mounting portion 46 at its lower end and a lever or actuating portion 48 at its free upper end. The helical portion 44 of the tube is offset from the mounting portion 46. The mounting portion 46, however, extends in a direction parallel to the axis of the helical portion 44 of the tube. The leverage portion 48 extends laterally, radially of the axis of the helical portion. The helical portion of the tube is of slightly flattened cross section.

The tube 45 is mounted within the casing 10 so that its portion 46 extends through an opening 51 in the plate 22 and through a block 50 that is soldered in the hollow stem 12 of the casing 10. Portion 46 is coaxial with stem 12. The end 47 of the stem portion 46 is open and projects into a recess 53 in the end of the stem 12. The portion 46 is secured in the block 50 by any conventional method, such as soldering, welding or brazing.

The portion 48 of the tube is adapted to engage the arm 32 of the crank unit 30. The end 49 of this portion 48 of the tube is closed by brazing or welding, so that when the casing is attached by means of its threads 14 to a pressure vessel, the pressure exerted in the interior of the tube tends to unwind the helical portion 44 of the tube, causing the leverage portion 48 of the tube to move in a counter-clockwise direction as viewed in FIG. 2.

The Bourdon tube 45 is in effect a coiled spring. It is so positioned within the casing 10 that its arm 48 maintains the arm 32 of the crank unit 30 against the stop member 40 when there is no pressure in the tube. The spring 38, as previously mentioned, urges the arm 32 of the crank unit 30 in a clockwise direction. Thus spring 38 maintains crank arm 32 constantly in physical engagement with the portion 48 of the tube at the inside thereof. As the pressure increases in the tube, the spring 38 moves the crank arm 32 clockwise as viewed in FIG. 2 to maintain the contact between the arm 32 and the portion 48, causing pointer 34 to register the amount of pressure within the tube on the dial 20.

By changing the distance between the axis Y (FIG. 5) of the pointer 34 and the axis X of the coil 44 of the Bourdon tube, the leverage of the portion 48 of the tube against the crank 30 can be changed, thus permitting a Bourdon coil of one size to be used in a wide variety of gauges of various pressure ranges. The change in distance between axes X and Y can be attained by rotating the coil portion 44 of the tube about the axis Z of the relatively fixed stem portion 46 of the tube.

Figure 5:
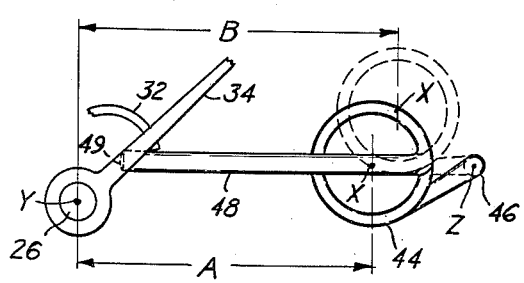
FIG. 5 is a diagrammatic view showing in full and in dotted lines, respectively, the helical Bourdon tube in alternate positions of adjustment for imparting, respectively, different leverages to the pointer of the gauge.

FIG. 5 shows in solid lines the position to which the coil portion 44 of the tube is rotated about fixed stem portion 46 to obtain a distance A between the axes Y and X where the Bourdon tube is to be used in an indicating gauge of a certain pressure range. In dotted lines the helical portion 44 of tube 45 is shown rotated slightly about the axis Z of the stem portion 46 of the tube to another position where the axis X and the axis Y are spaced apart a distance, denoted as B, which is greater than the distance A, thus making a gauge with a lower pressure range. Different dials 20 may be used for the different range gauges. The laterally projecting portion 48 of the tube is, of course, bent in any angular position of the tube about axis Z, to the proper position to hold the pointer 34 at the zero graduation on the selected dial face 20 when the tube is not subjected to pressure.

It is thus apparent that the same Bourdon coil can be positioned close to or away from the pointer pivot, and in this way the leverage of the laterally extending portion of the Bourdon tube can be adjusted to impart more or less motion to the pointer. Thus, even in short production runs one Bourdon coil may be used for a wide variety of gauges of various pressure ranges. For example, the same Bourdon coil can be used for pressure ranges from five hundred to three thousand pounds per square inch by merely adjusting the distance from the axis X of the Bourdon coil to the axis Y of the pointer.

The shape, number of turns, and general configuration of the Bourdon coil, as such, is not critical. Thus, although a helical type Bourdon coil having a plurality of turns is shown, it is understood that the coil may comprise more or less than the number of turns shown, or it may be less than a single turn, that is, of C configuration. It is also to be noted that the diameter of the basic round tubing used to make the Bourdon coil may be large or small in accordance with the individual needs of practice. The flatness and width of the flattened sections 44 of the coil is another variable that can be changed over a large range.

Thus, I have provided an improved Bourdon tube pressure gauge which is not only versatile in its application, more simple in its operation and more economical to construct, but by actual test is far superior in performance under rough service conditions than the conventional gauges which use linkages, hair springs, and geared type pointer movements.

Moreover, the accuracy and reliability of the gauge is increased, in that among other things, the construction of the gauge herein requires a very small angular motion or deflection of the Bourdon tube. This smaller total deflection for a given scale range subjects the Bourdon tube to considerably lower stresses, and will consequently show superior spring characteristics, lower hysteresis, and longer life. Furthermore, this smaller deflection increases the inherent stiffness or rigidity of the tube as a spring, thus increasing the pointer stiffness which contributes to the stability of the pointer for any given indication. This then also increases the accuracy and reliability of the gauge.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A pressure gauge comprising a casing, a graduated dial secured in said casing, a pointer pivotally mounted in said casing to read against the graduations of said dial, a Bourdon tube wound intermediate its open and closed ends in the form of a helical coil having a plurality of convolutions, the portion of said tube adjacent the open end of said tube extending parallel to the axis of said coil but being offset therefrom and being fixedly secured in said casing, and the portion of said tube adjacent the closed end of said tube extending laterally from said coil in a direction generally radial of the axis of said coil, the open end of said tube being connectable to a source of fluid pressure, and means operatively connecting said laterally extending portion of said tube to said pointer to pivot said pointer in accordance with the fluid pressure in said tube, the portion of said tube other than the first-named portion adjacent the open end of said tube being rotatably adjustable in said casing angularly about the axis of said first-named fixedly-secured portion of said tube as a pivot to vary the distance between the axis of said coil and the pivotal axis of said pointer, thereby to vary the range of pressures registrable on said dial.

2. A pressure gauge comprising a casing, a generally U-shaped member mounted in said casing for pivotal movement about an axis disposed between and extending in a direction generally parallel to the opposite side legs of said member, a graduated dial secured in said casing, a pointer secured to one leg of said member to move therewith and extending over said dial to read against the graduations of said dial, a Bourdon tube mounted in said casing, said Bourdon tube having a first portion adjacent its open end which is secured in said casing and having an actuating second portion adjacent its closed end which extends laterally from said tube and is engaged with the other side leg of said member, said tube being coiled intermediate said first and second portions in the form of a helical coil of a plurality of convolutions, said second portion extending generally radially of the axis of said coil portion, the open end of said tube being connectable to a source of fluid pressure, and a spring for holding said other side leg continuously in engagement with said actuating second portion whereby said pointer moves upon variation in fluid pressure in said tube, said first portion of said tube extending in a direction parallel to the axis of said coil portion of said tube and being offset therefrom, and the second and intermediate portions of said tube being adjustable about said first portion as a pivot thereby to vary the distance between the axis of said coil portion and the pivotal axis of said member to adjust said gauge for different pressure ranges.

References Cited in the file of this patent

UNITED STATES PATENTS

| | | |
|---|---|---|
| 1,070,392 | Benecke | Aug. 19, 1913 |
| 1,083,902 | Schubert | Jan. 6, 1914 |
| 1,982,300 | Harrison | Nov. 27, 1934 |
| 2,540,583 | Ives | Feb. 6, 1951 |
| 2,665,584 | Bacon | Jan. 12, 1954 |
| 2,813,427 | Lindsay et al. | Nov. 19, 1957 |
| 2,934,729 | Bourns | Apr. 26, 1960 |